(12) United States Patent
Yoon et al.

(10) Patent No.: US 11,046,887 B2
(45) Date of Patent: Jun. 29, 2021

(54) PHOTONIC CRYSTAL COMPRISING PHOTO-RESPONSIVE MOLECULES AND METHOD OF PREPARING THE SAME

(71) Applicant: KOREA ADVANCED INSTITUTE OF SCIENCE AND TECHNOLOGY, Daejeon (KR)

(72) Inventors: Dong Ki Yoon, Daejeon (KR); Wongi Park, Daejeon (KR); Min Yong Yang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 154 days.

(21) Appl. No.: 16/358,868

(22) Filed: Mar. 20, 2019

(65) Prior Publication Data
US 2019/0292456 A1   Sep. 26, 2019

(30) Foreign Application Priority Data

Mar. 21, 2018  (KR) .................... 10-2018-0032862

(51) Int. Cl.
| | |
|---|---|
| C09K 19/26 | (2006.01) |
| G02B 1/00 | (2006.01) |
| G02F 1/1337 | (2006.01) |
| B82Y 30/00 | (2011.01) |
| B82Y 20/00 | (2011.01) |

(52) U.S. Cl.
CPC .............. *C09K 19/26* (2013.01); *G02B 1/005* (2013.01); *G02F 1/1337* (2013.01); *B82Y 20/00* (2013.01); *B82Y 30/00* (2013.01); *G02B 2207/101* (2013.01); *G02F 2202/32* (2013.01); *G02F 2203/11* (2013.01)

(58) Field of Classification Search
CPC ...................................................... C09K 19/26
See application file for complete search history.

(56) References Cited

U.S. PATENT DOCUMENTS

2013/0248350 A1*  9/2013  Sukhomlinova ....... C09K 19/60
                                                                  204/157.15

FOREIGN PATENT DOCUMENTS

| KR | 100975658 B1 | 8/2010 |
|---|---|---|
| KR | 1020160061255 A | 5/2016 |

OTHER PUBLICATIONS

Gorecka et al. ,"Photoresponsive helical Nano filaments of B4 phase" Journal of Materials Chemistry C: Materials for Optical and Electronic Devices (2014), 2(13), 2323-2327. (Year: 2014).*

(Continued)

*Primary Examiner* — Chanceity N Robinson
(74) *Attorney, Agent, or Firm* — Hultquist, PLLC; Steven J. Hultquist (57) ABSTRACT

Disclosed are photonic crystals containing photoresponsive molecules and a method of preparing the same. More particularly, it is possible to synthesize photonic crystals containing photoresponsive molecules that induce photoalignment of azobenzene by ultraviolet irradiation using bent-shaped liquid crystal molecules containing azobenzene, which causes photo-isomerization upon ultraviolet irradiation, form a periodic structure in a visible light region using a self-assembly phenomenon occurring as temperature decreases, realize a reflection color and enable reversible pattering.

8 Claims, 7 Drawing Sheets
(7 of 7 Drawing Sheet(s) Filed in Color)

(56) References Cited

OTHER PUBLICATIONS

Zhang et al., "Helical Nanofilaments of bent-core liquid crystals with a second twist." Nature Communications (2014) vol. 5, pp. 1-6. (Year: 2014).*

Gorecka et al. "Linkage-length dependent structuring behavior of bent-core molecules in helical nanostructures" (2016), Graduate School of Nanoscience and Technology, KAIST, Daejeon, 305-701, S. Korea. (Year: 2016).*

Zep, A., et al., "Photoresponsive Helical Nanofilaments of B4 Phase", "J. Mater. Chem. C", 2014, pp. 2323-2327, vol. 2.

Zhang, C., et al., "Helical Nanofilaments of Bent-Core Liquid Crystals With a Second Twist", "Nature Communications", Feb. 19, 2014, pp. 1-6, vol. 5, No. 3302.

Chung, K., et al., "Flexible, Angle-Independent, Structural Color Reflectors Inspired by Morpho Butterfly Wings", "Adv. Mater.", 2012, pp. 2375-2379, vol. 24.

Kang, H.S., et al., "Printable and Rewritable Full Block Copolymer Structural Color", "Adv. Mater.", 2017, pp. 1700084-1700091.

Lee, S.S., et al., "Robust Microfluidic Encapsulation of Cholesteric Liquid Crystals Toward Photonic Ink Capsules", "Adv. Mater.", 2014, pp. 1-7.

Lin, S.Y., et al., "A Three-Dimensional Photonic Crystal Operating at Infrared Wavelengths", "Nature", Jul. 1998, pp. 251-253, vol. 394.

* cited by examiner

PHOTONIC CRYSTAL COMPRISING PHOTO-RESPONSIVE MOLECULES AND METHOD OF PREPARING THE SAME

TECHNICAL FIELD

The present invention relates to photonic crystals containing photoresponsive molecules and a method of preparing the same, and more particularly to photonic crystals containing photoresponsive molecules that induce photoalignment of azobenzene by ultraviolet irradiation using bent-shaped liquid crystal molecules containing azobenzene, which causes photo-isomerization upon ultraviolet irradiation, and that control the directionality and crystallinity of supramolecular structures using a self-assembly phenomenon occurring as temperature decreases, and a method of preparing the same.

BACKGROUND ART

Multilayer interference colors can be found in articles for daily use, such as soap bubbles and compact discs. There are a number of natural examples of interference colors, such as the morpho butterfly, wild turkeys, and beetles, which realize vivid colors regardless of viewing angle. This unique color expression is generally an important issue in material science, and there are a variety of application fields, such as reflective displays, sensors and security. Recently, top-down methods, such as deposition, photolithography and electrochemistry, and bottom-up methods, such as self-assembly of liquid crystals and block copolymers, have been developed. Such a top-down method has been highly developed and enhanced in the semiconductor industry, but it has disadvantages of requiring several steps and entailing high costs. It is also difficult to modify the structure after the manufacturing process is finished. On the other hand, a bottom-up process using a self-assembly phenomenon has a great advantage in that manufacturing is easy. For example, when a unit for forming a self-assembling structure is left at a specific temperature or in a concentrated state, it spontaneously forms a nanostructure. However, the self-assembly method is not easy to use to pattern a large area. With the goal of patterning such a self-assembling structure, studies have been conducted on color modulation techniques using a swelling phenomenon in a desired part by spraying a solvent onto formed photonic crystals. However, this is patterning using only a difference in color, and is not patterning that substantially forms a crystal structure only in a desired part. In addition, although a micro-encapsulation technique using flowable liquid crystals such as cholesteric liquid crystals has been introduced, it still has limitations in terms of uniformity, high resolution and smooth surface characteristics. In order to produce a reflective color in a visible light region, the structures thereof should have a periodicity in the visible light region and a suitable crystal structure. In addition, reasonable expression of an amorphous property is required in order to ensure that a constant color is seen at a given angle.

Recently, a self-assembly phenomenon in which bent-shaped liquid crystal molecules grow from a smectic phase having a layered structure to a helical nano-filament (HNF) phase has been reported. The bent-shaped liquid crystal molecules are known to have, as a periodic structure, a twisted-layer structure of about 200 nm or more.

Korean Patent No. 10-0975658 discloses hemispherical patterning of photonic crystals using a photopolymerizable colloidal dispersion medium and a method of manufacturing various shapes of photonic crystals, and Korean Patent Laid-open Publication No. 2016-0061255 discloses an inverse opal structure polymer identification film and a method for manufacturing the same.

Further, in order to form a photonic crystal pattern, a process of etching photonic crystals containing a photoresist or directly printing a colloidal dispersion medium only in a desired part has been utilized (K. Chung et al., Adv. Mater. 2012, 24, 2375-2379; S. Y. Lin et al., J. Bur, Nature, 1998, 394, 251; H. S. Kang et al., Adv. Mater. 2017, 29, 1700084; S. S. Lee et al., Adv. Mater. 2015, 27, 627-633). However, the photonic crystal pattern produced using such a method has a problem in that it is unsatisfactory in terms of processing difficulty and the amount of time required for the process.

As a result of intensive efforts to solve the above problems, the present inventors have found that, by inducing the photoalignment of azobenzene based on phase transition through ultraviolet irradiation to bent-shaped liquid crystal molecules containing azobenzene which causes photo-isomerization by ultraviolet irradiation, a periodic photonic crystal structure in a visible light region containing supramolecular liquid crystal molecules having controlled directionality and crystallinity is formed and selective reflection corresponding thereto is caused, and that various and reversible patterning is possible using a patterned-irradiating method. Based on these findings, the present invention was completed.

DISCLOSURE OF INVENTION

Therefore, it is one object of the present invention to provide a photonic crystal that forms a photonic band gap in a visible light region through a periodic nanostructure and a method for producing the same.

It is another object of the present invention to provide use of the photonic crystal for anti-counterfeit tags for bills or money, reflective displays, biosensors, decorative articles, polarimeters, circular dichroism spectrometers, and the like.

In accordance with the present invention, the above and other objects can be accomplished by the provision of a photonic crystal containing a photoresponsive bent-shaped liquid crystal molecule, wherein two azobenzene groups are bonded via a linker interposed therebetween.

In accordance with another aspect of the present invention, provided is a method of preparing a photonic crystal including (a) irradiating unpolarized ultraviolet rays to a photoresponsive bent-shaped liquid crystal molecule having two azobenzene groups bonded via a linker interposed therebetween at an isotropic temperature to photo-align the liquid crystal molecule, and (b) cooling the photo-aligned liquid crystal molecule to induce phase transition.

In accordance with another aspect of the present invention, provided is an anti-counterfeit tag for bills or money, a reflective display, a biosensor, a decorative article, a polarimeter, or a circular dichroism spectrometer, each including the photonic crystal.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which.

BEST MODE FOR CARRYING OUT THE INVENTION

Unless defined otherwise, all technical and scientific terms used herein have the same meanings as appreciated by those skilled in the field to which the present invention pertains. In general, the nomenclature used herein is well-known in the art and is ordinarily used.

According to the present invention, it was found that, when inducing the photoalignment of azo based on phase transition through ultraviolet irradiation to bent-shaped liquid crystal molecules containing azobenzene, which causes photo-isomerization upon unpolarized ultraviolet irradiation, a periodic photonic crystal structure of the visible light region containing supramolecular liquid crystal molecules having controlled directionality and crystallinity is formed, and selective reflection corresponding thereto is caused, so that photonic crystals, which have to date been difficult to implement in practice due to high manufacturing costs, can be widely applied to a variety of fields including anti-counterfeit tags for bills or money, reflective displays, biosensors and decorative articles.

Accordingly, in one aspect, the present invention is directed to a photonic crystal containing a photoresponsive bent-shaped liquid crystal molecule, wherein two azobenzene groups are bonded via a linker interposed therebetween.

In the present invention, the photoresponsive bent-shaped liquid crystal molecule may be represented by the following Chemical Formula 1:

[Chemical Formula 1]

wherein L represents a linear or branched alkylene group, a cycloalkylene group, a haloalkylene group, an arylene group, a heteroarylene group, an arylene alkylene group, an alkylene arylene group, an alkylene heteroarylene group, a heteroarylene alkylene group, an alkylene ester group or an alkylene amide group, wherein the heteroarylene group is a divalent radical containing a hetero atom selected from fluorine, oxygen, sulfur and nitrogen, and $R_1$ and $R_2$ are each independently a linear or branched alkyl group, a cycloalkyl group, a haloalkyl group, an alkoxy group, a cycloalkoxy group, an aryl group, a heteroaryl group, an aryloxy group, an alkoxy heteroaryl group, a heteroaryloxyalkyl group, an alkyl heteroaryl group, an alkylaryl group, an arylalkyl group, an alkyl ester group, an alkyl amide group or an acrylic group, wherein the heteroaryl group is a monovalent radical containing a hetero atom selected from fluorine, oxygen, sulfur and nitrogen.

Regarding L in Chemical Formula 1, preferably, the linear alkylene group is a C1-C12 linear alkylene group, the branched alkylene group is a C1-C12 branched alkylene group, the cycloalkylene group is a C3-C13 cycloalkylene group, the haloalkylene group is a C1-C12 alkylene group substituted with fluorine, chlorine or iodine, the arylene group is a C6-C13 arylene group, the heteroarylene group is a C5-C13 heteroarylene group, the arylene alkylene group is a C7-C13 arylene alkylene group, the alkylene arylene group is a C7-C13 alkylene arylene group, the alkylene heteroarylene group is a C6-C13 alkylene heteroarylene group, and the heteroarylene alkylene group is a C6-C13 heteroarylene alkylene group.

As used herein, the term "substituted" means that any one or more hydrogen atoms of a designated atom are substituted with a substituent of a designated group, and the condition is that the designated atom should not exceed a normal valency, so that a stable compound is produced after the substitution.

Regarding $R_1$ and $R_2$ of Chemical Formula 1, preferably, the linear alkyl group is a C1-C12 linear alkyl group, the branched alkyl group is a C1-C12 branched alkyl group, the cycloalkyl group is a C3-C13 cycloalkyl group, the haloalkyl group is a C1-C12 alkyl group substituted with fluorine, chlorine or iodine, the alkoxy group is a C1-C12 alkoxy group, the cycloalkoxy group is a C3-C13 cycloalkoxy group, the aryl group is a C6-C13 aryl group, the heteroaryl group is a C5-C13 heteroaryl group, the aryloxy group is a C7-C12 aryloxy group, the alkoxy heteroaryl group is a C7-C13 alkoxy heteroaryl group, the heteroaryloxyalkyl group is a C7-C13 heteroaryloxyalkyl group, the alkyl heteroaryl group is a C7-C13 alkyl heteroaryl group, the alkylaryl group is a C7-C13 alkylaryl group, the aryl alkyl group is a C7-C13 aryl alkyl group, the alkyl heteroaryl group is a C6-C13 alkyl heteroaryl group, the alkyl ester group is a C2-C13 alkyl ester group, and the alkyl amide group is a C1-C12 alkyl amide group.

In one embodiment of the present invention, azo groups are introduced into dimer molecules in which two rod-shaped liquid crystal molecules are bound by a flexible alkyl group, so that a helical nanofilament structure using bent liquid crystal molecules can be expressed. The liquid crystal molecules containing azo groups have a tendency to be aligned perpendicular to an ultraviolet ray irradiation direction when ultraviolet rays are irradiated thereto. Using this tendency, liquid crystals can be aligned by irradiating non-polarized ultraviolet rays from a high-temperature nematic/smectic phase, and supramolecular helical nanofilament structures that are expressed as the temperature is lowered can be controlled.

In the present invention, the photoresponsive bent-shaped liquid crystal molecule may be represented by the following Chemical Formula 2:

[Chemical Formula 2]

wherein $R_1$ and $R_2$ are each independently a linear or branched alkyl group, a cycloalkyl group, a haloalkyl group, an alkoxy group, a cycloalkoxy group, an aryl group, a heteroaryl group, an aryloxy group, an alkoxy heteroaryl group, a heteroaryloxyalkyl group, an alkyl heteroaryl group, an alkylaryl group, an arylalkyl group, an alkyl ester group, an alkyl amide group or an acrylic group, wherein the heteroaryl group is a monovalent radical containing a hetero atom selected from fluorine, oxygen, sulfur and nitrogen.

In a more specific embodiment of the present invention, the photoresponsive bent-shaped liquid crystal molecule may include one or more selected from the group consisting of Chemical Formulas 2-1, 2-2, 2-3 and 2-4:

[Chemical Formula 2-1]

[Chemical Formula 2-2]

[Chemical Formula 2-3]

[Chemical Formula 2-4]

According to the present invention, preferably, the photoresponsive bent-shaped liquid crystal molecule may be a perfluorinated-tail dimer represented by the following Chemical Formula 3:

[Chemical Formula 3]

wherein n is an odd number of 3 to 11.

According to the present invention, preferably, the photoresponsive bent-shaped liquid crystal molecule may be a halogenated-wing dimer represented by the following Chemical Formula 4:

[Chemical Formula 4]

wherein X is F, Cl, Br or I, and n is an odd number of 3 to 11.

According to the present invention, preferably, the photo photoresponsive bent-shaped liquid crystal molecule may be a stilbene dimer represented by the following Chemical Formula 5:

[Chemical Formula 5]

wherein n is an odd number of 3 to 11.

In one embodiment of the present invention, supramolecular structures formed by liquid crystal molecules can be controlled using photoresponsive molecules, thereby forming photonic crystals. A sandwich cell consisting of a black substrate and a transparent substrate is produced, liquid crystals are injected into cells in an isotropic phase, and after completion of injection, a photomask is then disposed on the cells and ultraviolet rays are irradiated thereon, and at the same time, cooling is conducted. The supramolecular structure of the part irradiated with ultraviolet rays is regularly controlled, and a photonic crystal pattern in a visible light region is formed. The formed photonic crystal can be reversibly reused by elevating and lowering the temperature. This is a breakthrough technology for commercialization of photonic crystals capable of realizing simplification of conventional photonic crystal manufacturing processes, reduction of material costs, and reusable patterning.

Figure 1:
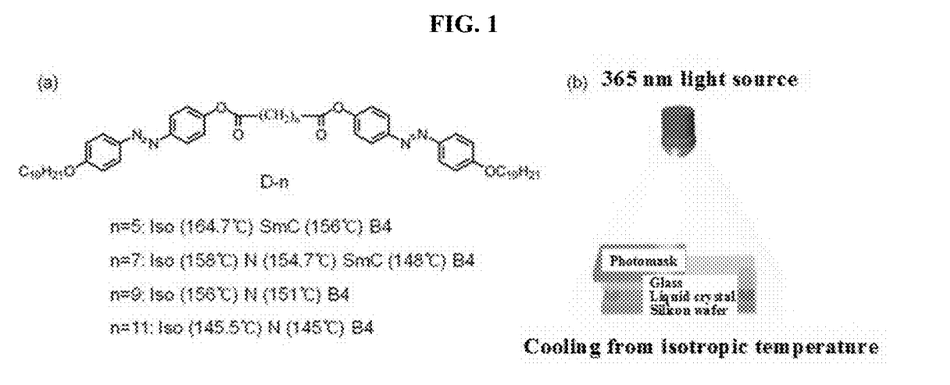
FIG. 1 shows the structure of a photoresponsive bent-shaped liquid crystal molecule according to an embodiment of the present invention (a), and a schematic diagram illustrating a process for patterning while cooling from an isotropic temperature (b)

FIG. 1A shows a molecular structure of a bent-shaped liquid crystal and a phase transition depending on temperature, and FIG. 1B is a schematic view illustrating a process for forming a photonic crystal using a photomask and ultraviolet rays in a sandwich cell containing a liquid crystal. FIG. 1A shows the structure of the photoresponsive bent-shaped liquid crystal molecule used in the present invention, and the structure of the photoresponsive bent-shaped liquid crystal molecule is classified into D-5, D-7, D-9 and D-11 depending on the number of alkyl groups in a central linking site. As the temperature is reduced, all of these molecules enter a B4 (HNF) liquid crystal phase at room temperature through a nematic or smectic phase, which is a flexible liquid crystal phase. The liquid crystal is injected into a sandwich cell including silicon and glass at an isotropic temperature and is cooled while being irradiated with ultraviolet light. At this time, patterning is possible by disposing a photomask of a desired pattern on a glass substrate (FIG. 1B).

In the present invention, the photoresponsive bent-shaped liquid crystal molecule is formed in a multilayer structure of a periodic 200 to 280 nm twisted-layer structure in the visible light region, thereby realizing a reflection color.

Figure 2:
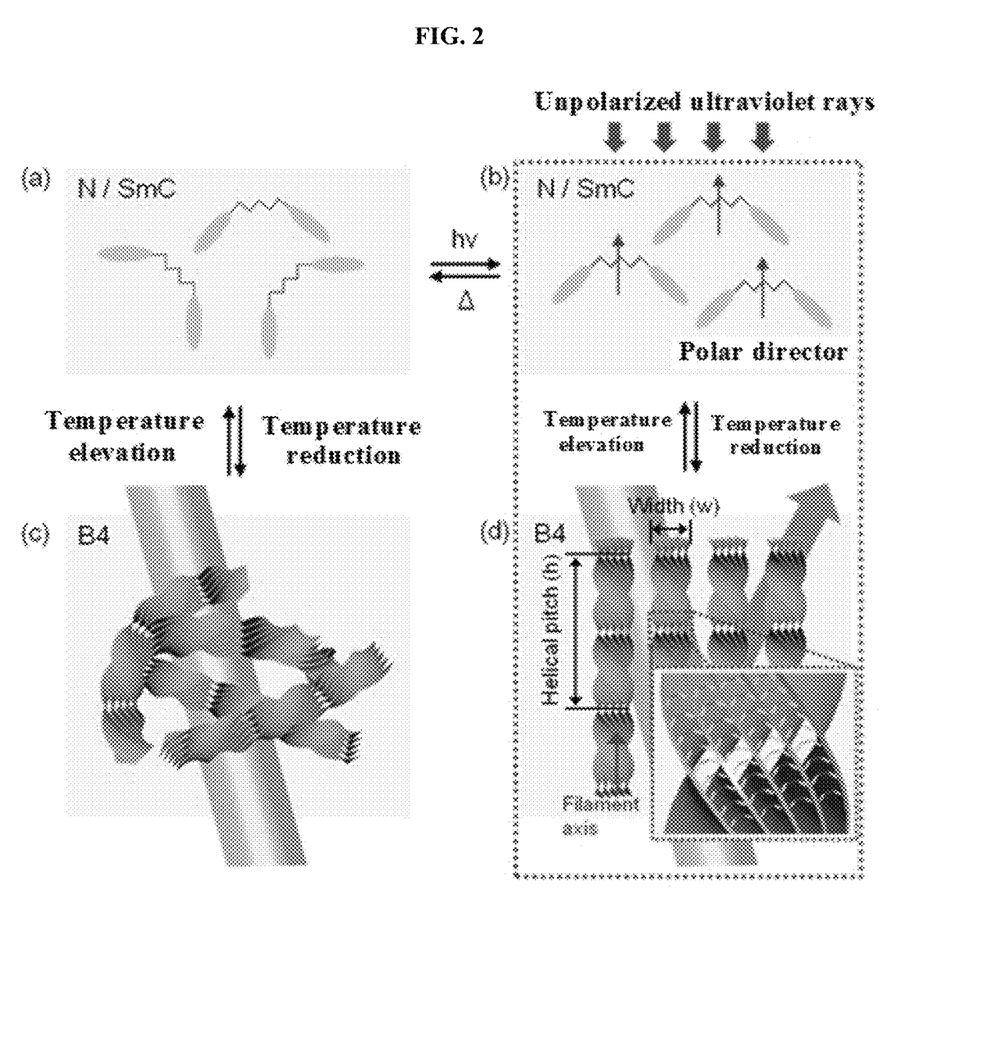
FIG. 2 is a schematic diagram showing alignment of liquid crystals by unpolarized ultraviolet irradiation and expression of nanostructures by phase transition according to an embodiment of the present invention.

FIGS. 2A and 2B show alignment control of the bent-shaped liquid crystal by ultraviolet irradiation according to the present invention, and FIGS. 2C and 2D are schematic diagrams showing the alignment and optical characteristics of the helical nanostructure formed upon temperature reduction and phase transition. In FIGS. 2A and 2B, in the case of liquid crystals in a nematic or smectic phase, polar directors are aligned parallel to the direction of light by the irradiation of ultraviolet rays. In any case, a temperature reduction causes phase transition and growth into helical nanostructures. At this time, the growth direction of the nanostructure is determined depending on the alignment direction of the liquid crystal (FIGS. 2C and 2D). All reactions occur in a manner that is reversible by changing the temperature and radiating ultraviolet light.

The axis of the controlled helical nanofilament is re-aligned parallel to the direction of irradiated ultraviolet light, and the helical pitch of the helical nanostructure is formed in the visible light region. Thus, a blue or yellowish-green reflection wave is obtained as the number of alkyl groups increases. This demonstrates that patterning is possible by selectively controlling the region exposed to light, and that reversible control is possible simply by elevating or lowering the temperature. Furthermore, a highly precisely controlled helical nanostructure, which is surface-coated with a metal, can be used as a template for a metamaterial in the visible region.

Figure 3:
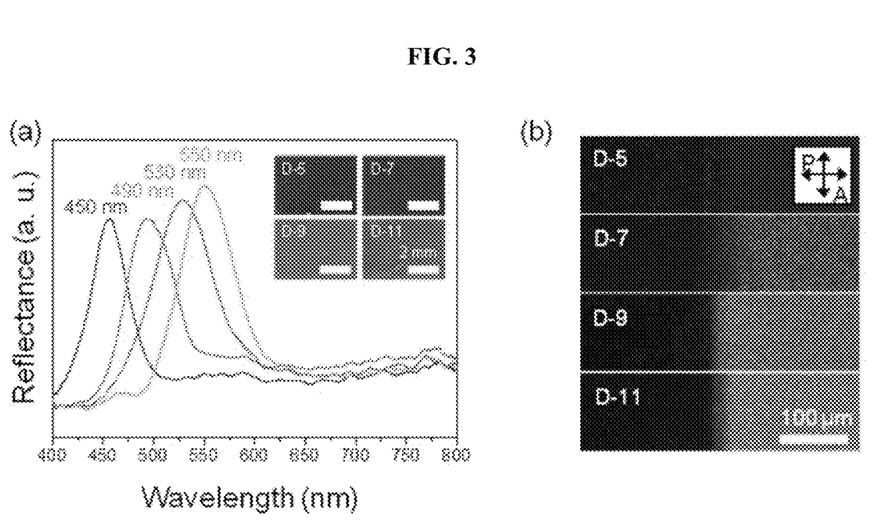
FIG. 3 shows the color of photonic crystals formed by nanostructures according to an embodiment of the present invention.

FIG. 3 shows the color of photonic crystals formed by nanostructures. As can be seen from the reflection wavelength, which changes as the number of alkyl groups increases (FIG. 3A), and a polarized light micrograph showing the vicinity of the pattern boundary of photonic crystals formed by a photomask (FIG. 3B), as the number of n in —$(CH_2)_n$— (wherein n is an odd number from 1 to 3) increases, the photonic crystal has a reflection wavelength of 450 nm blue to 550 nm substantially greenish blue, and thus reflects light corresponding thereto. The reflection color is formed only in the region where the ultraviolet ray is applied, and is not formed in the region covered by the photomask.

Figure 4:
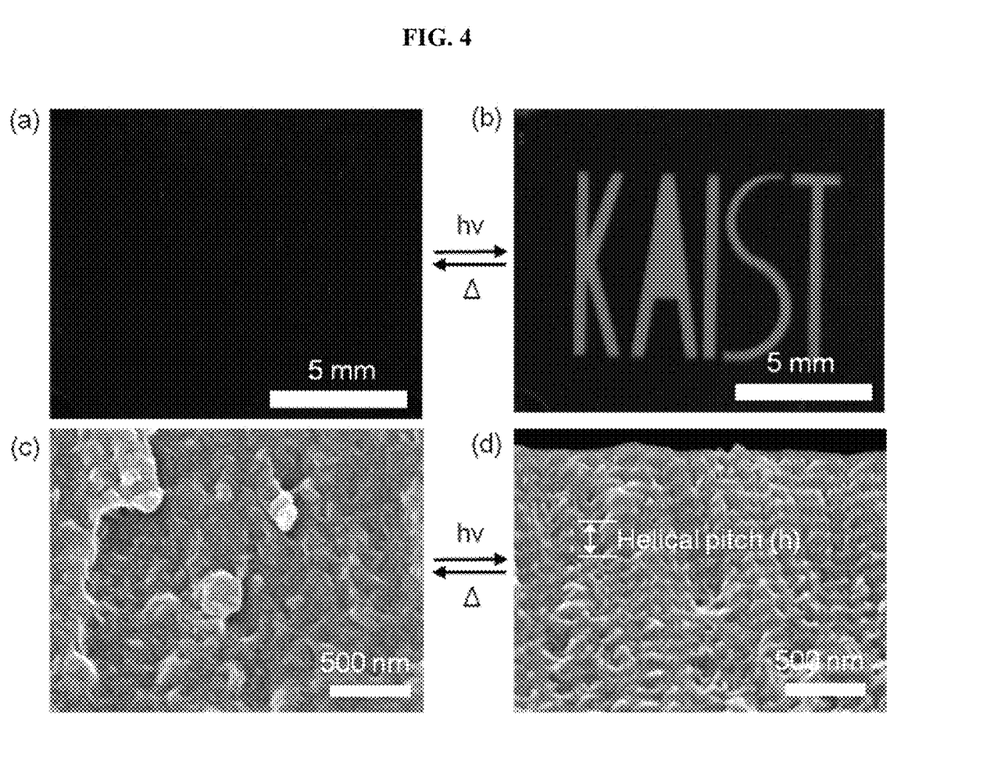
FIG. 4 shows photonic crystal patterns produced by a photomask according to an embodiment of the present invention and cross-sectional electron micrographs thereof.

FIG. 4 shows photonic crystal patterns produced by the photomask and cross-sectional electron micrographs thereof. A photomask having the characters "KAIST" engraved therein can be used to form a photonic crystal pattern corresponding to the photomask, and the photonic crystal pattern can be reversibly controlled by elevating or lowering the temperature (FIGS. 4A and 4B). A significant change in the nanostructure can be seen from FIGS. 4C and 4D, which are electron micrographs of the cross-section of nanostructure controlled by ultraviolet rays.

The bent-shaped liquid crystal molecules containing azobenzene groups are irradiated with unpolarized ultraviolet rays at a high temperature, such that bent polar directors thereof are aligned parallel to the ultraviolet ray irradiation direction. As the temperature decreases, phase transition occurs, and the axis of helical nanofilaments, which are supramolecular structures formed thereby, is controlled to be parallel to the ultraviolet irradiation direction. On the other hand, in the part not exposed to light, the supramolecular structures are randomly aligned. Well-aligned helical nanofilaments form a periodic structure in the visible region, so that a reflection color is realized. The inevitable amorphous property of an organic material hinders the formation of perfect crystal structures and thereby a structure is formed that does not change in color depending on the angle of incidence. Since this is a nano-structure formed by noncovalent bonding, it can be reversibly returned to the original randomly aligned nanostructure by elevating and lowering the temperature. That is, it is possible to synthesize a photonic crystal that can be recycled and reversibly patterned.

Thus, in another aspect, the present invention is directed to a method of preparing a photonic crystal including (a) irradiating unpolarized ultraviolet rays to a photoresponsive bent-shaped liquid crystal molecule having two azobenzene groups bonded via a linker interposed therebetween at an isotropic temperature to photo-align the liquid crystal molecule, and simultaneously (b) cooling the photo-aligned liquid crystal molecule to induce phase transition.

The method is characterized in that, by cooling the liquid crystal molecule to room temperature, the liquid crystal molecule undergoes phase-transition to a B4 liquid crystal phase (HNF) through a nematic and/or smectic phase, and the growth direction of the photonic crystal is determined depending on the alignment direction.

The liquid crystal may be photo-aligned parallel to the ultraviolet ray irradiation direction.

In the method of preparing a photonic crystal, the cooling may be conducted at a cooling rate of 0.3 to 1° C./min for a cooling time of 10 to 30 minutes.

Thus, in another aspect, the present invention is directed to an anti-counterfeit tag for bills or money, a reflective display, a biosensor, a decorative article, a polarimeter, or a circular dichroism spectrometer, each including the photonic crystal.

Hereinafter, preferred examples of the present invention will be suggested for better understanding of the present invention. However, it will be obvious to those skilled in the art that these examples are provided only for illustration of the present invention and that various alterations and modifications are possible without departing from the principles and spirit of the invention, and these alterations and modifications fall within the scope of the appended claims.

EXAMPLE

Example 1: Production of Photonic Crystal

First, a sandwich cell using a silicon substrate (lower plate) and a glass substrate (upper plate) was produced. The reason for using a silicon substrate is to prevent undesired further scattering and reflection of incident white light so that the reflection color from the liquid crystal film can be seen clearly, and the reason for using a glass substrate is to transmit the light to the sample. Spacing between the substrates was maintained using a few micrometers (μm) of silica beads. A liquid crystal sample was injected into a cell using a capillary force at an isothermal temperature of about 170° C.

The liquid crystal sample used was divided into D-5, D-7, D-9 and D-11 corresponding to Chemical Formulae 2-1, 2-2, 2-3 and 2-4, respectively, depending on the number of alkyl groups in a central linking part.

[Chemical Formula 2-1]

-continued

[Chemical Formula 2-2]

[Chemical Formula 2-3]

[Chemical Formula 2-4]

TABLE 1

Isotropic temperature, nematic phase and smectic phase temperatures of liquid samples

| | Isotropic temperature | Nematic phase | Smectic phase |
|---|---|---|---|
| D-5 | 164.7 | — | 156 |
| D-7 | 158 | 154.7 | 148 |
| D-9 | 156 | 151 | — |
| D-11 | 145.5 | 145 | — |

After the injection of liquid crystals was completed, a photomask of a desired pattern was loaded on the upper plate, and ultraviolet rays having a wavelength of 365 nm were irradiated thereon (FIG. 1B). The liquid crystal was aligned by ultraviolet rays, and at the same time, cooled at a constant cooling rate (1° C./min) in order to cause phase transition. At this time, the cooling rate was controlled by a temperature controller (Linkam TMS94). The cooling was carried out until a B4 phase, which is a solid phase, was obtained, and the total time required was about 30 minutes. The final structure has a reflection color due to uniformly formed helical nanostructures.

As shown in FIGS. 2A and 2B, polar directors of liquid crystals on a nematic or smectic phase are aligned parallel to the direction of light by the irradiation of ultraviolet rays. In both cases, phase transition occurs due to the temperature reduction, and liquid crystals grow into helical nanostructures. At this time, the growth direction of the nanostructures is determined depending on the alignment direction of the liquid crystals (FIGS. 2C and 2D). All processes occur in a manner that is reversible by changing the temperature or radiating ultraviolet light.

The reflection wavelength, which changes as the number of alkyl groups increases, and the vicinity of the pattern boundary of the photonic crystal formed by the photomask were imaged by a polarization microscope, and the images are shown in FIG. 3.

As shown in FIG. 3A, light from blue (450 nm) to yellowish green (550 nm) is reflected as the number of alkyl groups increases. As shown in FIG. 3B, the reflection color is formed only in the region where the ultraviolet rays are incident, and is not formed in the part covered by the photomask.

A reversible KAIST photonic crystal pattern produced using a photomask and nanostructures controlled by UV rays were imaged using an electron microscope, and the images are shown in FIG. 4.

As shown in FIG. 4, a photomask having characters "KAIST" engraved therein can be used to form a photonic crystal pattern corresponding to the photomask, and the photonic crystal pattern can be reversibly controlled by elevating or lowering the temperature (FIGS. 4A and 4B). A significant change in the nanostructure can be seen when observing the cross-section thereof with an electron microscope (FIGS. 4C and 4D).

Example 2: Identification of Chirality Using Photonic Crystal Film

Figure 5:
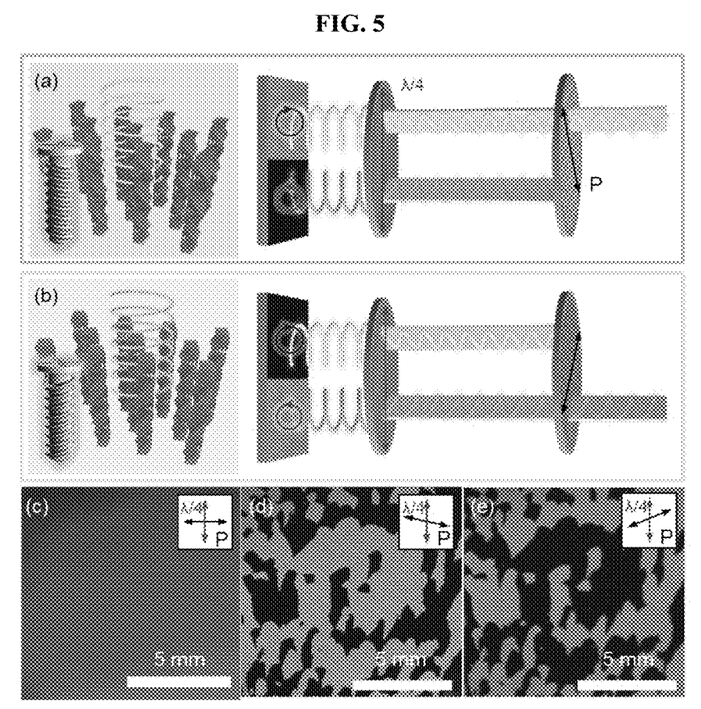
FIG. 5 shows chirality using a photonic crystal film produced according to an embodiment of the present invention.

It was found that circularly polarized light is reflected from a helical photonic crystal film. The chirality of the produced photonic crystal film can be identified using a quarter wave plate and a linear polarizer capable of retarding the phase of light by a quarter wavelength. In this case, since the helical structure is a racemic compound having a combination of levorotation and dextrorotation, left circularly polarized light and right circularly polarized light are reflected together. It can be seen from the right side of FIGS. 5A and 5B that two types of circularly polarized light are converted to mutually different types of linearly polarized light while passing through the wave plate. The linear polarized light thus converted is selectively transmitted by a linear polarizer present in the rightmost part. That is, as shown in FIGS. 5C, 5D and 5E, domains, which are clearly distinguishable as linearly polarized light is rotated, are observed. These are chiral domains having different helical directions. As shown in FIG. 5C, when the axes of two optical films (wave plate, linear polarizer) are orthogonal, no two domains are observed, because two types of light (light expressed in blue and red) are transmitted at the same intensity. However, when the two optical film axes are shifted from each other (dislocated), as in FIGS. 5D and 5E, a contrast in the intensity at which the two kinds of light are transmitted is generated, and thus chiral domains are observed. The chiral photonic crystals produced by a conventional method of producing photonic crystals based on soft materials are chiral in only one direction or form a racemic mixture having very small chiral domains. However, the photonic crystal structure of the present invention forms a chiral domain that can be seen with the naked eye without using a microscope, which is a technique that is difficult to accomplish using conventional manufacturing processes.

Figure 6:
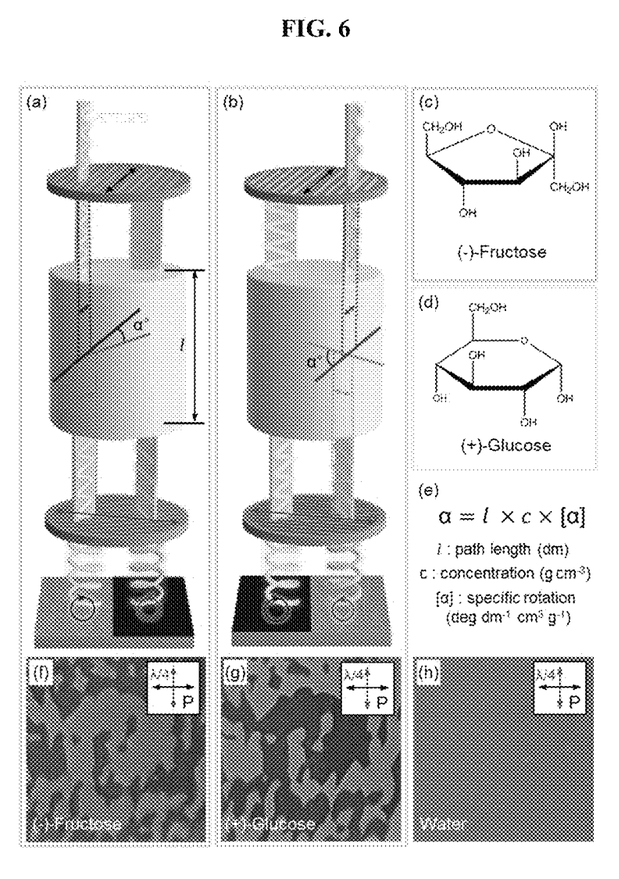
FIG. 6 shows a optical activity of a chiral solution using a photonic crystal film produced according to an embodiment of the present invention.

The method of the present invention allows for use as a sensor capable of detecting the twist direction of the chiral solution. The axes of two optical films (wave plate, linear polarizer) are disposed vertically, and then a cylinder (yellow cylinder) is disposed between the films. The chiral solution to be detected may be contained in this cylinder and then observed. At this time, the chiral solution has a property of rotating linearly polarized light incident upon the solution in a specific direction, which is called "optical activity" (equation of FIG. 6E). α represents the degree to which linear polarized light rotates, and it rotates clockwise in the positive (+) case and counterclockwise in the negative (−) case. When (−) chiral fructose is dissolved in water and then observed, levorotatory light is predominantly observed, as shown in FIGS. 6A and 6F (skeleton pattern appears bright). On the other hand, when (+) chiral glucose is dissolved in water and then observed, dextrorotatory light is predominantly observed, as shown in FIGS. 6B and 6G. When a solution (water) having no chirality is observed, no domain is observed, as shown in FIG. 6H. In other words, what kind of chirality a given solution has can be detected depending on how the skeleton pattern appears.

Figure 7:
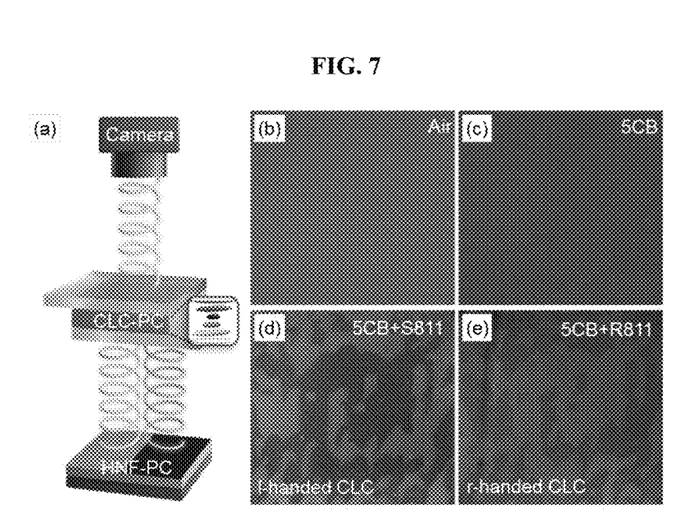
FIG. 7 shows chirality of a solid film using a photonic crystal film produced according to an embodiment of the present invention.

This technique can replace polarimeters and circular dichroism spectrometers (CD spectrometers), which are currently used for chirality detection. For example, although the prices of polarimeters and CD spectrometers are in the range of several millions to several tens of millions of won (Korean currency), the present invention can be used in an easy and simple manner because only an optical lens costing several hundreds of thousands of won or less is utilized, and the volume is remarkably small. In addition, the aforementioned two kinds of detection equipment are easy to use to detect the chirality of a liquid, but have a limitation on detection of chirality of a solid film. However, the present invention can easily detect the chirality of a solid film as well. For example, a cholesteric liquid crystal (CLC) film, which is a solid chiral film, cannot be detected using conventional equipment, but when the film is placed on the photonic crystal film of the present invention, chirality can be detected. That is, when a levorotatory (left-rotatable) CLC is placed on the photonic crystal film according to the present invention, a black skeleton pattern is detected, as shown in FIG. 7D, whereas when a dextrorotatory (right-rotatable) CLC is placed thereon, a bright skeleton pattern is detected, as shown in FIG. 7E. Observation through a non-chiral object shows that no domain is observed, as shown in FIGS. 7B and 7C.

INDUSTRIAL APPLICABILITY

According to the present invention, it is possible to reversibly control the alignment of liquid crystals on a variety of substrates in a noncontact manner, so that they can be utilized for supramolecular-structure-based nanomaterials. In particular, the controlled helical nanostructures according to the present invention can form photonic crystal structures of a visible light region and thereby form reversible photonic crystals enabling patterning.

The method of aligning azo by irradiating the unpolarized ultraviolet rays is a highly reliable technique already applied to various liquid crystals and organic single molecules, and is a very simple and highly effective method because it can be carried out reversibly using ultraviolet irradiation without directly contacting substances.

Such a method is expected to be widely used in the photonic crystal industry, which to date has been difficult to implement in practice due to high manufacturing costs. The liquid crystals can be applied to various optical fields such as anti-counterfeit tags applicable to bills, reflective displays, biosensors and decorative articles.

In addition, the method according to the present invention is a bottom-up method which can be directly applied to various practical industries such as security, display, sensor and art (commercial logos) fields, because it is easy and is capable of traditionally processing nanostructures growing in a large area in a top-down manner.

In addition, unlike conventional photonic crystal patterning, which is conducted using a semiconductor etching process through the introduction of a photo-resist, the method according to the present invention utilizes photoisomerization of liquid crystals themselves including direct response by light, thereby simplifying the manufacturing process based on the introduction of self-assembling structures. A technology of controlling photoresponsive liquid-crystal-based nanostructures utilizes photoalignment of liquid crystals themselves, thus having advantages of not requiring a photoresist and being capable of forming a photonic crystal pattern within a short time. In addition, the present structure, formed based on a non-covalent bond, can be reversibly controlled depending on temperature and thus is recyclable.

Although specific configurations of the present invention have been described in detail, those skilled in the art will appreciate that preferred embodiments of this description are given for illustrative purposes and should not be construed as limiting the scope of the present invention. Therefore, the substantial scope of the present invention is defined by the accompanying claims and equivalents thereto.

The invention claimed is:

1. A photonic crystal comprising a photoresponsive bent-shaped liquid crystal molecule in which two azobenzene groups are bonded via a linker interposed therebetween,
   wherein the photoresponsive bent-shaped liquid crystal molecule is represented by Chemical Formula 3 or Chemical Formula 4,
   wherein the photoresponsive bent-shaped liquid crystal molecule has a multilayer structure of a periodic 200 to 280 nm twisted layered structure in a visible light region, in order to realize a reflection color, and
   wherein the photonic crystal has a reflection wavelength close to green light of 550 nm from blue of 450 nm as a number of n in —$(CH_2)_n$—, wherein n is an odd number from 1 to 3, increases:

[Chemical Formula 3]

wherein n is an odd number from 3 to 11,

[Chemical Formula 4]

wherein X is F, Cl, Br or I and n is an odd number from 3 to 11.

2. A method of preparing a photonic crystal of claim 1, comprising:
   (a) photo-aligning liquid crystal molecule by irradiating unpolarized ultraviolet rays to a photoresponsive bent-shaped liquid crystal molecule in which two azobenzene groups are bonded via a linker interposed therebetween at an isotropic temperature of the liquid crystal molecule; and
   (b) inducing phase transition by cooling the photo-aligned liquid crystal molecule.

3. The method of preparing a photonic crystal of claim 2, wherein the liquid crystal molecule is cooled to room temperature and the phase transition of the liquid crystal molecule is occurred to a B4 liquid crystal phase via a nematic phase or a smectic phase or a nematic phase and smectic phase.

4. The method of preparing a photonic crystal of claim 2, wherein a growth direction of the photonic crystal is determined depending on an alignment direction of the liquid crystal.

5. The method of preparing a photonic crystal of claim 2, wherein the liquid crystal is photo-aligned parallel to an ultraviolet ray irradiation direction.

6. The method of preparing a photonic crystal of claim 2, wherein the cooling is conducted at a cooling rate of 0.3 to 1° C./min for a cooling time of 10 to 30 minutes.

7. A decorative article comprising the photonic crystal of claim 1.

8. A polarimeter comprising the photonic crystal of claim 1.

* * * * *